US011801603B2

(12) United States Patent
Federici et al.

(10) Patent No.: US 11,801,603 B2
(45) Date of Patent: Oct. 31, 2023

(54) OPERATING DEVICE

(71) Applicant: SOREMARTEC S.A., Senningerberg (LU)

(72) Inventors: Fabio Federici, Senningerberg (LU); Fabio Perrone, Senningerberg (LU)

(73) Assignee: SOREMARTEC S.A., Senningerberg (LU)

( * ) Notice: Subject to any disclaimer, the term of this patent is extended or adjusted under 35 U.S.C. 154(b) by 372 days.

(21) Appl. No.: 17/315,808

(22) Filed: May 10, 2021

(65) Prior Publication Data

US 2021/0354296 A1   Nov. 18, 2021

(30) Foreign Application Priority Data

May 12, 2020   (IT) .......................... 102020000010804

(51) Int. Cl.
| | | |
|---|---|---|
| *B25J 9/16* | (2006.01) | |
| *B25J 9/10* | (2006.01) | |
| *B25J 13/08* | (2006.01) | |
| *F16M 11/20* | (2006.01) | |
| *F16M 13/02* | (2006.01) | |

(52) U.S. Cl.
CPC ............ *B25J 9/1666* (2013.01); *B25J 9/106* (2013.01); *B25J 13/086* (2013.01); *F16M 11/2021* (2013.01); *F16M 13/02* (2013.01)

(58) Field of Classification Search
CPC ........ B25J 9/1666; B25J 9/106; B25J 13/086; B25J 9/1694; B25J 9/046; B25J 9/1674; B25J 19/027; B25J 19/06; B25J 19/02; B25J 9/16; B25J 9/1676; B25J 9/1684; B25J 9/06; B25J 19/04; F16M 11/2021; F16M 13/02; G05B 2219/40202
USPC ................ 700/245–264; 318/568.11–568.25
See application file for complete search history.

(56) References Cited

U.S. PATENT DOCUMENTS

| | | | | |
|---|---|---|---|---|
| 4,831,549 A | * | 5/1989 | Red .................... | G05B 19/4182 |
| | | | | 700/254 |
| 7,539,558 B2 | * | 5/2009 | Adachi .................. | B25J 9/0003 |
| | | | | 700/245 |
| 7,778,732 B2 | * | 8/2010 | Adachi .................. | B25J 9/1676 |
| | | | | 700/250 |

(Continued)

FOREIGN PATENT DOCUMENTS

DE       102012014249 A1 *  1/2014   ............ B25J 13/086

*Primary Examiner* — Jaime Figueroa
(74) *Attorney, Agent, or Firm* — ROTHWELL, FIGG, ERNST & MANBECK, P.C.

(57) ABSTRACT

An operating device configured to operate in a work space, the operating device including: a robot arm, which includes a succession of arm elements mounted on one another in a rotatable way about respective axes of rotation and which carries an operating unit on its end; and at least one presence sensor prearranged for detecting the presence of an operator. The device includes a positioning system, including a support by which the at least one presence sensor is carried and which is mounted on an arm element of the robot arm, according to a pre-set orientation and in such a way as to be orientable with respect to the arm element, and wherein the positioning system further includes a positioning unit prearranged for rotating the support with respect to the arm element, as a result of a movement of the robot arm, so as to keep the pre-set orientation of the support unchanged.

10 Claims, 5 Drawing Sheets

(56) References Cited

U.S. PATENT DOCUMENTS

| | | | | |
|---|---|---|---|---|
| 8,315,735 B2* | 11/2012 | Nihei | B25J 9/1676 318/568.18 | |
| 9,452,532 B2* | 9/2016 | Komatsu | B25J 9/1676 | |
| 10,345,788 B2* | 7/2019 | Watanabe | B25J 9/1666 | |
| 10,369,700 B2* | 8/2019 | Kuroda | B25J 9/1651 | |
| 10,556,353 B2* | 2/2020 | Su | B25J 9/12 | |
| 10,647,007 B2* | 5/2020 | Cordoba | A61B 1/00149 | |
| 10,668,625 B2* | 6/2020 | Kuroda | A61B 34/74 | |
| 10,726,538 B2* | 7/2020 | Braune | G06V 20/52 | |
| 10,795,342 B1* | 10/2020 | Cai | G05B 19/41805 | |
| 10,875,187 B2* | 12/2020 | Paquin | B25J 9/0081 | |
| 10,969,762 B2* | 4/2021 | Hornung | B25J 9/1676 | |
| 11,045,955 B2* | 6/2021 | Okahara | B25J 9/1694 | |
| 11,361,391 B2* | 6/2022 | Ottnad | G06Q 50/04 | |
| 2006/0126918 A1* | 6/2006 | Oohashi | G05D 1/0251 382/153 | |
| 2008/0161970 A1* | 7/2008 | Adachi | B25J 9/1697 901/49 | |
| 2009/0125145 A1* | 5/2009 | Adachi | B25J 9/0003 700/250 | |
| 2016/0184032 A1* | 6/2016 | Romo | B25J 9/1682 901/46 | |
| 2016/0199984 A1* | 7/2016 | Lohmeier | A61B 34/74 700/251 | |
| 2017/0348854 A1* | 12/2017 | Oleynik | B25J 9/16 | |
| 2017/0357242 A1* | 12/2017 | Watanabe | B25J 9/1666 | |
| 2018/0043549 A1* | 2/2018 | Su | B25J 13/081 | |
| 2018/0079090 A1* | 3/2018 | Koenig | G01L 1/14 | |
| 2018/0080841 A1* | 3/2018 | Cordoba | A61B 34/37 | |
| 2018/0361589 A1* | 12/2018 | Paquin | B25J 9/1697 | |
| 2019/0244309 A1* | 8/2019 | Ottnad | H04W 4/02 | |
| 2019/0377322 A1* | 12/2019 | Hornung | G06T 7/80 | |
| 2019/0378264 A1* | 12/2019 | Braune | G06V 20/52 | |
| 2020/0198120 A1* | 6/2020 | Hashimoto | B25J 3/04 | |
| 2020/0310387 A1* | 10/2020 | Cai | B25J 9/1676 | |

\* cited by examiner

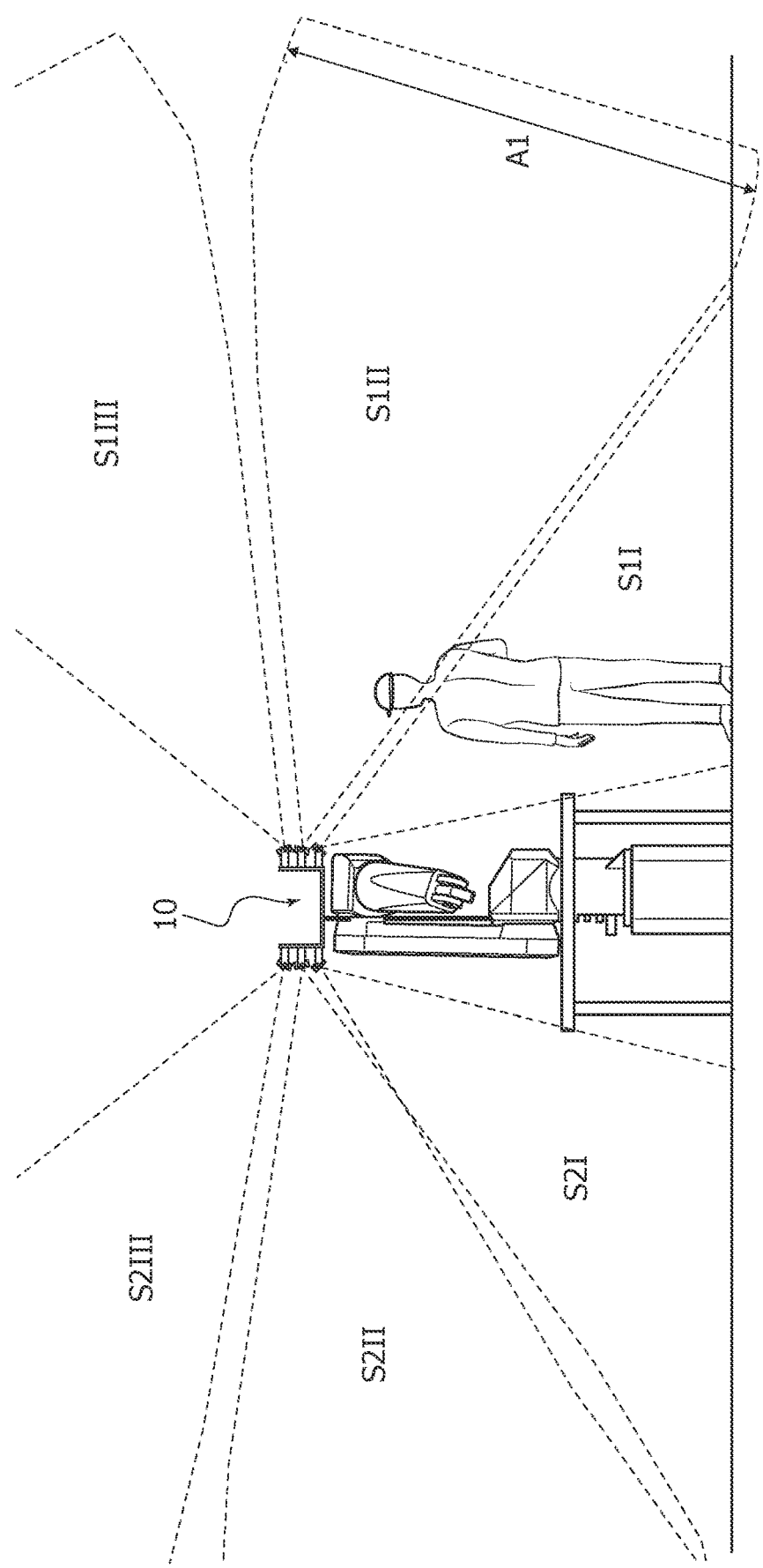

OPERATING DEVICE

CROSS REFERENCE TO RELATED APPLICATION(S)

This application claims priority to Italian Patent Application No. 102020000010804, filed May 12, 2020. The entirety of the disclosure of the above-referenced application is incorporated herein by reference.

TEXT OF THE DESCRIPTION

The present invention relates to an operating device prearranged for operating in a working area accessible to working staff.

In this context, there are known technical solutions for guaranteeing the safety of members of the working staff or other operators, which envisage monitoring an area surrounding an operating device and bringing the device into a condition of arrest or into a slowed-down operating mode, when it is detected that operators are approaching the device.

The solutions in question usually envisage a plurality of presence sensors, in multiple positions around the device so as to provide one or more monitoring areas.

On the other hand, also known in the art are operating devices specifically prearranged for continuous human-machine interaction, in total safety, which are commonly referred to as "collaborative robots", which integrate within them sensor systems of various types (for example, constituted by force sensors, proximity sensors, contact sensors, or a combination of these) for detecting and recognizing commands for the device that are issued by an operator through actions exerted directly on the robot.

The first type of known solution referred to above suffers from the drawback of being far from versatile on account of the fact that a new task to be assigned to the operating device can frequently require repositioning and reprogramming of the presence sensors in order to reconfigure the monitoring area.

On the other hand, the solution of collaborative robots suffers from the drawback of presenting a high complexity and equally high costs, which are due to the means necessary for rendering the robot capable of interacting directly, and in an instantaneous way, with the operator. However, this type of solution has not yet proven to be able to meet the needs of industrial lines operating according to cycles with high production volumes.

Finally, from the document No. WO2018/145990A1 there is also known a monitoring system for a robot arm that combines the solution of providing a plurality of presence sensors around the robot arm to define a given monitoring area with the solution of providing a presence sensor on the operating unit of the robot arm itself to define a mobile monitoring area fixed with respect to the operating unit. This solution presents the drawback of being far from versatile for the same reasons referred to above with reference to the first type of known solutions discussed. Moreover, the monitoring action performed by the mobile sensor with the operating unit of the robot proves far from effective in regard to the aim of guaranteeing a high level of safety for operators.

In this context, the object of the present invention is to provide an operating device that is able to overcome the aforesaid drawbacks.

The above object is achieved by an operating device having the characteristics recalled in claim 1.

Further characteristics and advantages of the present invention will emerge clearly from the ensuing description and the annexed drawings, wherein:

FIG. 4 is a front view of the device of FIG. 1 and of the region surrounding the work space in which the device operates;

Figure 1:
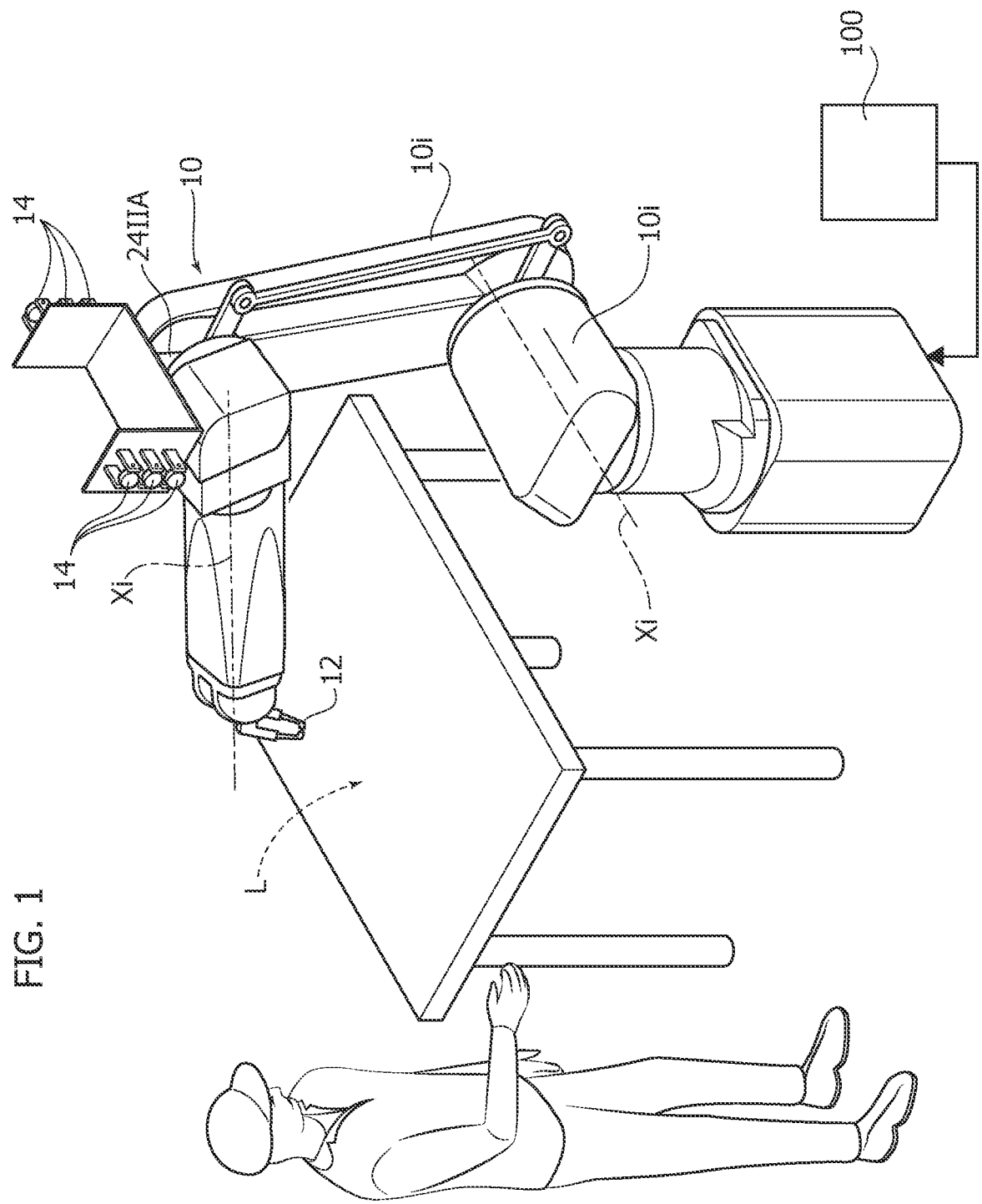
FIG. 1 illustrates an example of operating device of the type described herein, according to an axonometric view.

In the ensuing description, various specific details are illustrated, aimed at enabling an in-depth understanding of the embodiments. The embodiments may be obtained without one or more of the specific details, or with other methods, components, or materials, etc. In other cases, known structures, materials, or operations are not illustrated or described in detail so that various aspects of the embodiment will not be obscured.

The references used herein are provided merely for convenience and hence do not define the sphere of protection or the scope of the embodiments.

As anticipated at the start, the present invention regards an operating device prearranged for operating in a working area accessible to operating staff.

The present invention has been provided with particular reference to applications in the field of production and packaging of the foodstuff industry. However, the same teachings that will be provided in what follows may be applied in any other industrial field.

In general, with reference to FIGS. 1 to 4, the operating device described herein comprises a robot arm 10, which carries an operating unit 12 at its end.

The robot arm 10 comprises a succession of arm elements 10$i$ (illustrated in the example are the arm elements designated by 10I, 10II and 10III), which are mounted on one another in a rotatable way about respective axes of rotation $X_i$ (illustrated in the example are the axes of rotation denoted by X1, X2, and X3), and which are driven in motion, individually or in a number of elements simultaneously, to move the operating unit 12 in space.

In the example illustrated, the robot arm 10 is an articulated robot arm with six axes of rotation. The robot arm illustrated is in any case provided merely by way of example. The operating device described herein may in fact envisage a robot arm of some other type, for example an anthropomorphic robot, a SCARA robot, etc., with or without a seventh axis of translation for displacement of the robot between different workstations.

Once again with reference to the example illustrated, the robot arm 10 is prearranged for operating in a work space L for carrying out one or more tasks.

As has been said previously, the solution described herein has been devised with particular reference to the field of production and packaging in the foodstuff industry. In this connection, the tasks mentioned may, for example, regard the treatment, and/or handling, and/or positioning, of products and/or parts of product, and/or of packages and/or parts of packages, and/or of production means and/or packaging means.

The operating device can also be operatively associated to other devices or machinery for execution of the tasks referred to, for example conveying devices, such as conveyor belts, pallets, trolleys, benches, etc., or else further operating devices.

For instance, the operating device described herein may be used for operations of picking up and putting down products.

It should in general be noted that the use of the operating device described herein is not limited just to the field of the foodstuff industry, but rather may regard any other sector.

The operating device described herein further comprises at least one presence sensor 14 for detecting the presence of persons or objects. As will be seen in greater detail in what follows, the sensor or sensors 14 determine a monitoring volume.

As compared to the prior art, the device described herein is characterized in that the at least one presence sensor is carried by the robot arm itself by means of a positioning system that is able to keep, in a constant way, the presence sensor in a pre-set orientation, notwithstanding movement of the robot arm 10, in the work space L, for carrying out its tasks.

In general, the positioning system referred to comprises a support on which the at least one presence sensor 14 is carried and which is mounted on an element 10$i$ of the robot arm in such a way as to be orientable, and a positioning unit prearranged for rotating the support with respect to the arm element 10$i$ on which it is mounted, as a result of a movement of the robot arm, so as to keep the orientation of the support unchanged.

With particular reference to the example illustrated, the positioning system comprises a support 22, provided on which are a plurality of sensors 14 arranged in two parallel rows. The support 22 is, in particular, constituted by a plate bent to form a U having a base 22A and two sides 22B, opposite to one another and orthogonal to the base 22A. The two rows of sensors are mounted on the two sides 22B of the plate.

Figure 2:
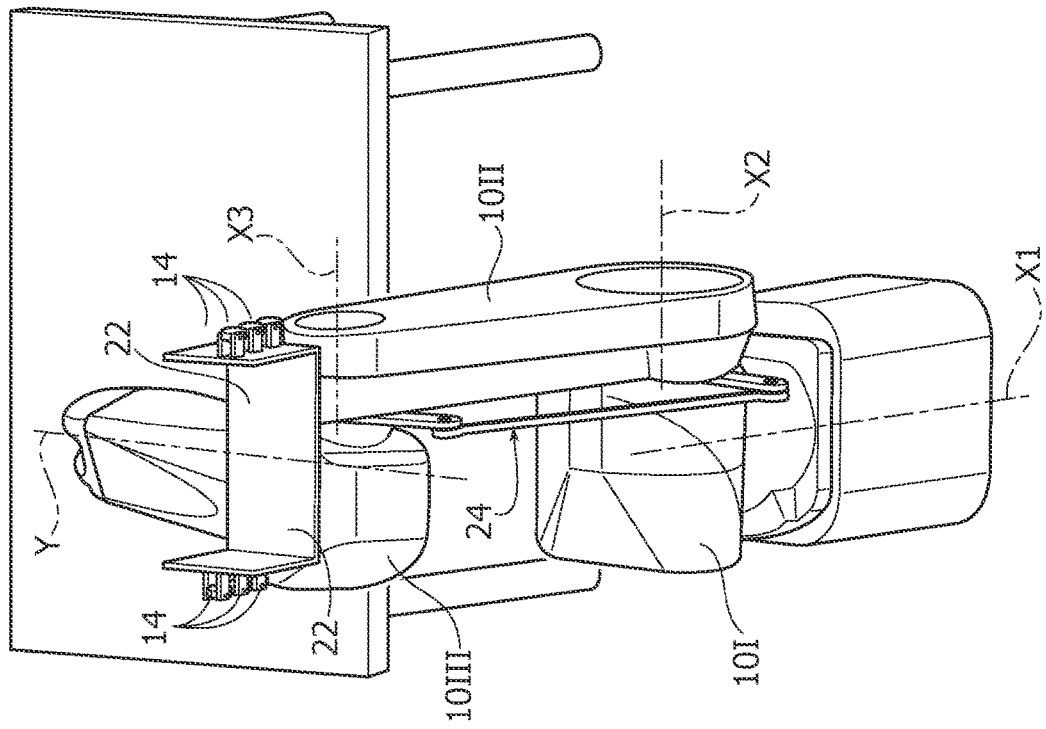
FIG. 2 is a view from above of the operating device of FIG. 1.

In the embodiment illustrated, the positioning unit comprises a four-bar linkage mechanism 24, which is constrained to the robot arm 10 and carries the support 22. The mechanism 24 operates to keep the support 22, and hence the sensors 14 arranged thereon, according to a pre-set orientation, so that the two rows of sensors 14 extend in respective vertical directions Z1, Z2, which are set at a distance apart in a horizontal direction Y (FIG. 2). The sensors 14 define monitoring volumes S1, S2, which are symmetrical with respect to the direction Y and extend on opposite sides of the robot arm 10 so to set themselves over areas alongside the robot that extend from the margins of the work space L (FIG. 4).

Figure 3:
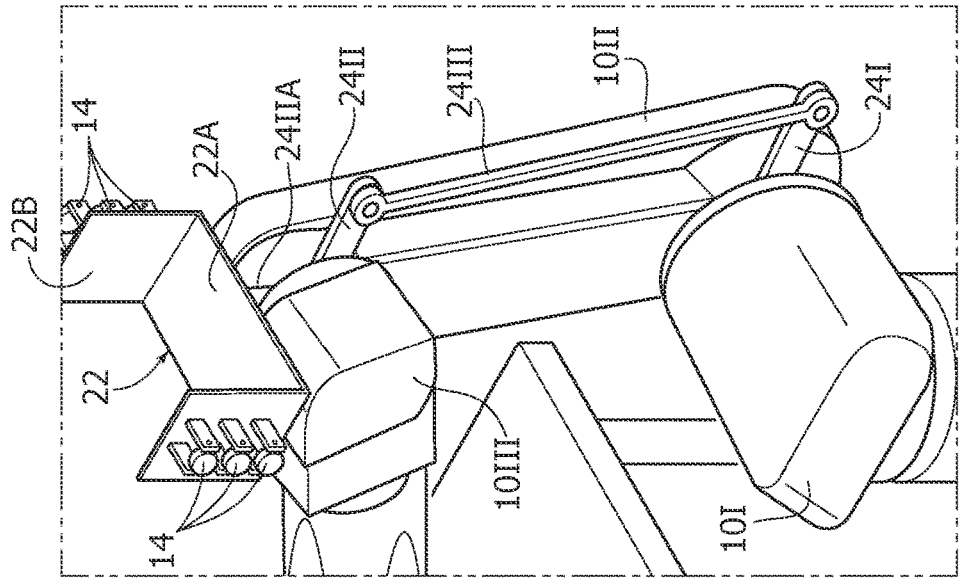
FIG. 3 is a detailed view of the operating device of FIG. 1.

In particular, with reference to FIG. 3, the four-bar linkage mechanism 24 comprises a first lever 24I, which is mounted at the coupling interface between the arm element 10I and the arm element 10II, and is fixed to the arm element 10I according to a horizontal orientation. The mechanism 24 further comprises a second lever 24II, which is mounted at the coupling interface between the arm element 10II and the arm element 10III, and is rotatable with respect to both of the two elements, about the axis of rotation X3, about which the arm element 10III is rotatably mounted on the arm element 10II. Finally, the mechanism 24 comprises a third lever 24III, which is rotatably connected at its opposite ends to the ends of the two levers 24I and 24II.

The lever 24II has an eccentric portion 24IIA, to which the support 22 is fixed. The support 22 is oriented with its base 22A set horizontally so as to keep the two rows of sensors 14 in the respective vertical directions Z1, Z2.

In view of the foregoing, the person skilled in the sector will understand that the mechanism 24 is prearranged for varying the configuration of its levers, as a result of a movement of the arm element 10II about the axis of rotation X2, in order to keep the support 22 in its horizontal orientation.

Figure 5A:
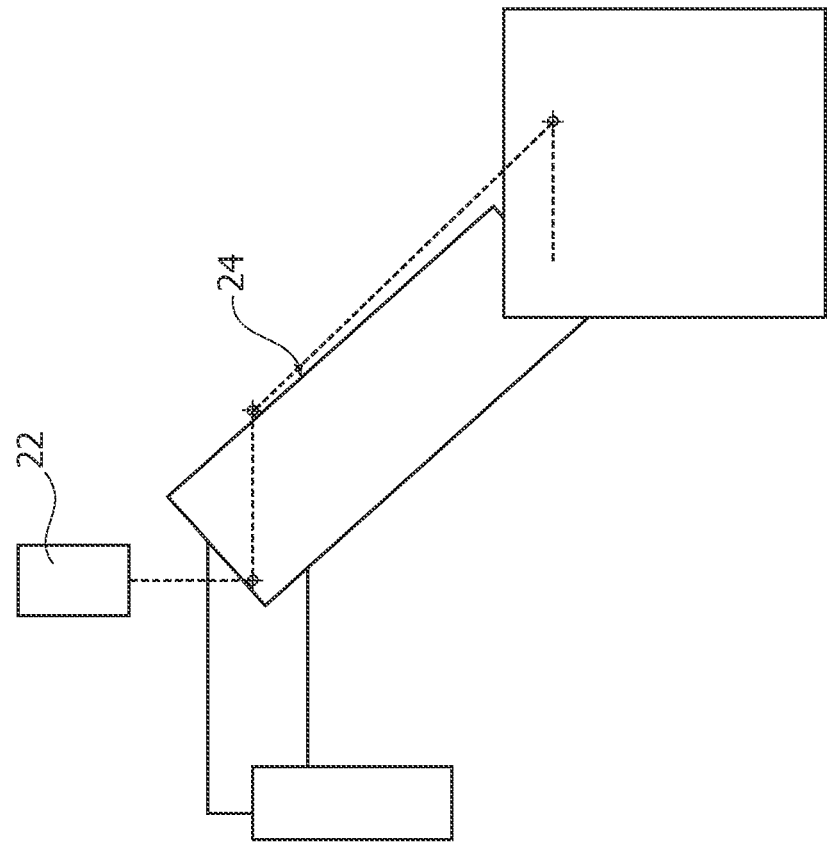
FIGS. 5A and 5B are schematic illustrations of the operating device of FIG. 1 in two respective different operating conditions.
Figure 5B:
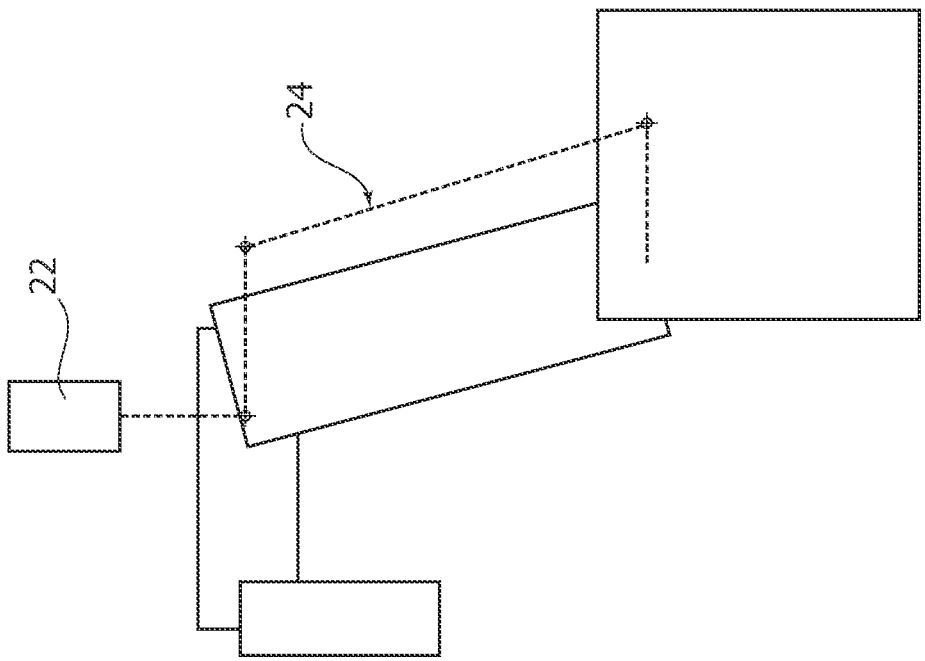

In this connection, FIGS. 5A and 5B illustrate the robot arm 10, respectively, in a first condition in which the arm element 10II is set oriented at an angle of approximately 20° with respect to the vertical, and in a second condition in which the arm element 10II is set oriented at an angle of approximately 45°. From these figures it appears clearly that the variation of position of the arm element 10II causes a change of configuration in the mechanism 24 so that the support 22 is rotated with respect to the arm element 10II in order to remain in the horizontal condition.

Thanks to the above operating mode of the system of positioning of the sensors 14, the monitoring volumes S1, S2 are kept constantly in line with the work space L.

It should now be noted that the positioning unit described, constituted by the four-bar linkage mechanism 24, is provided merely by way of example.

It may, in fact, be obtained according to other configurations, to perform the function referred to of keeping the orientation of the sensors 14 unchanged.

Figure 6:
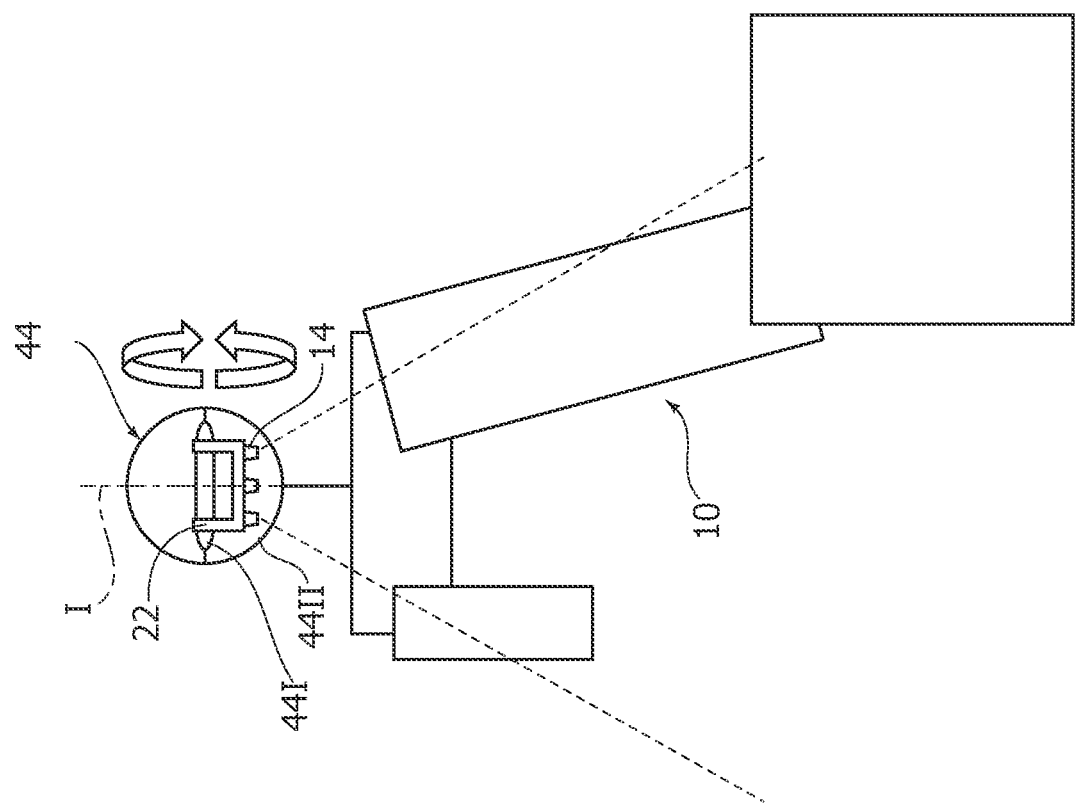
FIG. 6 illustrates a further example of the operating device described herein.

For instance, according to an alternative embodiment illustrated in FIG. 6, the positioning unit is constituted by a gyroscope system 44, comprising a rotor 44I, rotatably mounted about an axis of rotation I, and a mobile frame 44II, which carries the rotor 44I and defines one or two axes of oscillation, about which the axis of rotation I can be oriented in space. The support 22 is mounted fixed to the module of the mobile frame that carries the rotor 44I.

According to the characteristic operating mode of gyroscope systems, the axis of rotation I, and hence the support 22, remain in a pre-set orientation as a result of the angular momentum generated by the continuous rotation of the rotor 44I about the axis of rotation I, notwithstanding the movements of the robot arm 10 for executing the tasks assigned thereto.

Figure 7:
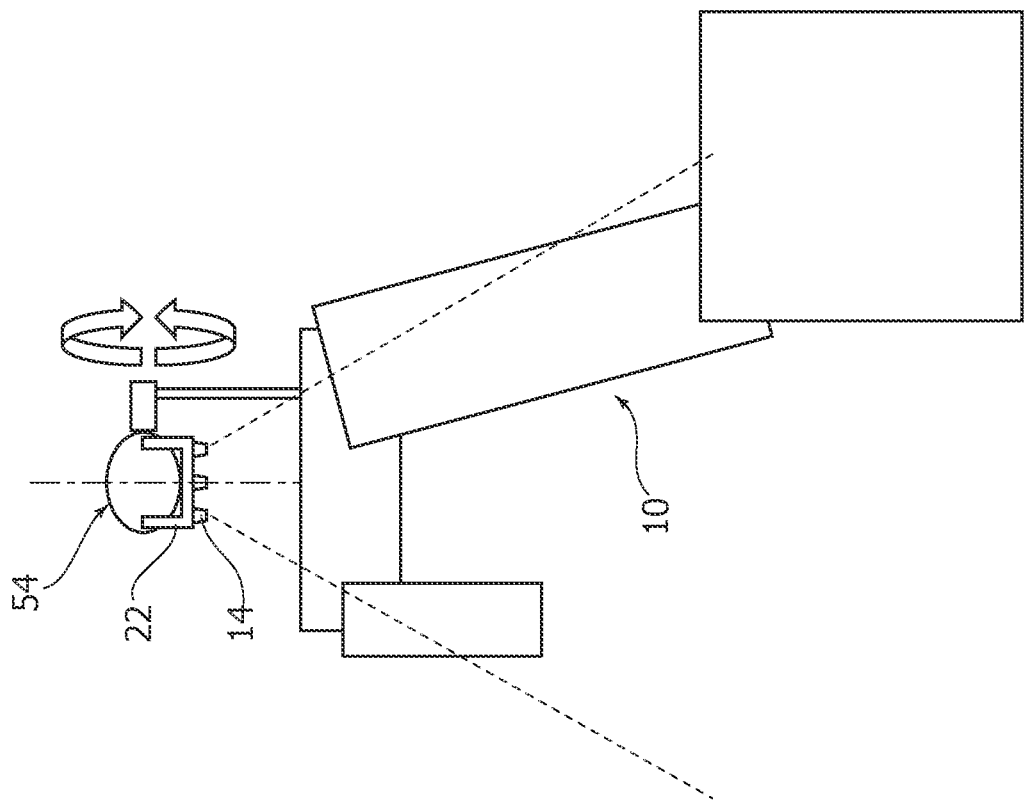
FIG. 7 illustrates yet another example of the operating device described herein.

According to a further variant (illustrated in FIG. 7), the positioning unit comprises an actuator 54 for moving the support 22 with respect to the arm element on which it is mounted, and a control unit (not illustrated) configured to control the actuator 54 on the basis of a signal indicating the position in space of the arm element, to keep the support 22 in the pre-set orientation.

In view of the foregoing, it will be understood that, in general, the aforementioned pre-set orientation of the support 22 and of the sensors 14 will preferably be a "horizontal" orientation, so that the positioning unit will be prearranged to intervene in order to keep the aforesaid orientation unaltered as a result of any movement of the arm element, by which the support 22 is carried, about a generic non-vertical axis (incidentally, it will be noted that here by "horizontal orientation" is meant a condition in which the support and/or the sensors are not necessarily arranged horizontally, but which, instead, is referenced with respect to a horizontal plane and envisages, with respect to this plane, that the distance of any one point of the support and of the sensors will be fixed and unchanged). On the other hand, the positioning unit will not intervene either during movements about a vertical axis or during rectilinear movements of the arm element, i.e., during movements that would not be able to alter the aforesaid pre-set orientation.

In any case, it is possible to envisage also embodiments in which the pre-set orientation of the support 22 and of the sensors 14 may be of some other type and the positioning unit will be prearranged to maintain this other orientation, in line with the modalities discussed above.

It will now be noted that the support 22 is advantageously mounted at a top point of the robot arm 10 positioned for operating in the work space L. This makes it possible to determine, through the sensors 14, monitoring volumes S1, S2 that come to intercept relatively extensive areas at quite a distance from the work space L.

In general, the solution described herein envisages determination of at least one monitoring volume, which is defined by the at least one presence sensor carried by the positioning system described above. The number, shape, and dimensions of the monitoring volumes may vary as a function of the specific applications.

The monitoring volumes S1, S2 of the example illustrated are generically shaped like the sector of a sphere (FIG. 4). They are each formed by a set of sections (S1I, S1II, S1III and S2I, S2II, S2III), each section being determined by a single sensor 14.

With specific reference to the monitoring volume S1, it comprises a first section S1I, a second section S1II, and a third section S1III, which each have a conical geometry and are oriented with their own geometrical axes according to angles, defined with respect to the horizontal plane of the floor, which progressively increase from the first section to the third section. The first section S1I is prearranged for identifying a possible presence of an operator immediately adjacent to the work space L. The second section S1II defines, instead, an area A1 of entry into the monitored area, which is positioned at a maximum distance from the work space L and through which it is possible to detect that an operator is approaching the work space. The third section S1III, which faces upwards, is prearranged for detecting any object overhead approaching the work space L (for example, on overhead conveying systems, such as overhead travelling cranes or suspended conveying lines).

The monitoring volume S2 is formed by the sections S2I, S2II, S2III according to the same modality.

In view of the foregoing, it emerges clearly that it is possible to provide monitoring volumes of any shape by putting together a given number of sections, determined by a corresponding number of presence sensors 14. On the other hand, it will also be possible to provide monitoring volumes formed by a single section, determined by a single presence sensor 14.

The sensors 14 may be of any known type, suited to the purposes referred to above. For instance, the sensors in question may be modules for emitting and receiving electromagnetic waves, prearranged for determining the positions and/or speeds of an object by analysing one or more characteristics of the signal generated from reception of the electromagnetic waves that are emitted by the module and then return to the same module, after being reflected by the object itself. The waves in question may, for example, be radio waves or microwaves. A type of sensor present on the market and suitable for the purposes referred to is represented by the safety radar sensor LBK® marketed by the company LEUZE. Another type is constituted by position and displacement laser sensors.

The person skilled in the art will understand that the sections (described above) of the monitoring volumes are determined by the beams of the electromagnetic waves emitted by the emitter and receiver modules. Consequently, the dimensions and geometries of the sections will depend upon the type of sensor used.

In a way in itself known, during operation, the monitoring volumes provided by the device are used to establish conditions of safety for the members of the working staff that might approach or gain access to the work space L.

In particular, a control unit 100 of the device can be configured to control different operating states of the robot arm 10 as a function of the signals coming from the sensors 14. The criteria and modalities with which to intervene on operation of the robot arm 10 can be established by standards currently in force in the various countries and in the various sectors of activity.

For instance, with reference to the application illustrated in FIGS. 1 to 4, the control unit 100 of the device can control operation of the robot arm 10, according to a mode of displacement at lower speeds at the moment when the sensors 14 detect that an operator is crossing the entry area A1, and then issue a command for complete arrest of the robot arm 10 at the moment when the sensors 14 detect the presence of the operator in the working area, close to the work space L, that is intercepted by the monitoring volume S1I.

Of course, without prejudice to the principle of the invention, the details of construction and the embodiments may vary, even significantly, with respect to what has been illustrated herein purely by way of non-limiting example, without thereby departing from the scope of the invention, as defined by the annexed claims.

The invention claimed is:

1. An operating device configured to operate in a work space (L), comprising:
   a robot arm (10), which comprises a succession of arm elements (10i) mounted on one another in a rotatable way about respective axes of rotation (Xi) and which carries an operating unit (12) on its end; and
   at least one presence sensor (14) prearranged for detecting the presence of an operator;
   said device being characterized in that it includes a positioning system comprising a support (22) by which the at least one presence sensor (14) is carried and which is mounted on an arm element (10II) of the robot arm, according to a pre-set orientation and in such a way as to be orientable with respect to the arm element (10II), and wherein the positioning system further comprises a positioning unit (24; 44; 54) prearranged for rotating the support (22) with respect to the arm element (10II), as a result of a movement of the robot arm, so as to keep the pre-set orientation of the support (22) unchanged.

2. The device according to claim 1, wherein said support (22) is mounted on an intermediate arm element (10II) of the succession of arm elements of the robot arm.

3. The device according to claim 1, wherein the robot arm is an articulated robot arm comprising a succession of six arm elements (10i) mounted on one another in a rotatable way about six respective axes of rotation (Xi), and wherein the support (22) is mounted on the second arm element (10II) that there is starting from a base on which the robot arm is mounted.

4. The device according to claim 1, wherein said at least one presence sensor (14) determines a monitoring volume (S1, S2), which is oriented laterally with respect to the robot arm (10) and defines an inlet area (A1) for detecting an operator approaching the work space (L).

5. The device according to claim 4, comprising a plurality of presence sensors (14), which are mutually arranged to form at least one monitoring volume (S1, S2), which has given dimensions and geometry.

6. The device according to claim 1, wherein said presence sensor (14) is a module for emitting and receiving electromagnetic waves.

7. The device according to claim 1, wherein said positioning unit comprises a four-bar linkage mechanism (24), which is connected to the support (22) and to the arm element (10II) on which the support is mounted, and operates for rotating the support (22) with respect to the arm element (10II), as a result of a movement of the arm element (10II) about the respective axis of rotation (X2), to keep the support (22) in the pre-set orientation.

8. The device according to claim 1, wherein said positioning unit comprises a gyroscope system (44), which carries the support (22) and operates to keep the support (22) in the pre-set orientation, as a result of a movement of the robot arm (10).

9. The device according to claim 1, wherein said positioning unit comprises an actuator (54) for moving the support (22) with respect to the arm element on which it is mounted, and a control unit configured to control the actuator (54) as a function of the position of the arm element, to keep the support in the pre-set orientation.

10. The device according to claim 1, comprising a control unit (100) configured to drive the robot arm (10) into a safety state, as a function of signals coming from the at least one presence sensor (14).

* * * * *